(12) United States Patent
Kameta et al.

(10) Patent No.: US 9,905,264 B2
(45) Date of Patent: Feb. 27, 2018

(54) SERVO CONTROL SYSTEM HAVING FUNCTION OF SWITCHING LEARNING MEMORY

(71) Applicant: FANUC CORPORATION, Yamanashi (JP)

(72) Inventors: Kouki Kameta, Yamanashi (JP); Naoto Sonoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/194,571

(22) Filed: Jun. 28, 2016

(65) Prior Publication Data

US 2017/0004857 A1 Jan. 5, 2017

(30) Foreign Application Priority Data

Jun. 30, 2015 (JP) .................. 2015-132050

(51) Int. Cl.
| | |
|---|---|
| *G05B 11/01* | (2006.01) |
| *G06F 19/00* | (2011.01) |
| *G11B 21/10* | (2006.01) |
| *G05B 13/02* | (2006.01) |
| *G05D 1/00* | (2006.01) |

(52) U.S. Cl.
CPC .......... *G11B 21/10* (2013.01); *G05B 13/0265* (2013.01); *G05B 2219/42151* (2013.01); *G05D 1/0088* (2013.01)

(58) Field of Classification Search
None
See application file for complete search history.

(56) References Cited

U.S. PATENT DOCUMENTS

2004/0210345 A1* 10/2004 Noda .................. G05D 1/0088
700/245
2012/0256566 A1* 10/2012 Chaffee ................ G05B 19/056
318/34

FOREIGN PATENT DOCUMENTS

| CN | 1523734 A | 8/2004 |
|---|---|---|
| CN | 1700124 A | 11/2005 |
| CN | 102189550 A | 9/2011 |
| CN | 102929213 A | 2/2013 |
| JP | 4-323706 A | 11/1992 |
| JP | 2004227163 A | 8/2004 |
| JP | 2007206857 A | 8/2007 |
| JP | 2010009529 A | 1/2010 |

* cited by examiner

*Primary Examiner* — Bentsu Ro
*Assistant Examiner* — Zemenay Truneh
(74) *Attorney, Agent, or Firm* — Hauptman Ham, LLP

(57) ABSTRACT

A servo control system according to the present invention includes a servo control device for driving a driven body that operates periodically using a servomotor; and a learning controller for generating correction data based on a location deviation with respect to a uniform command pattern, and storing the correction data in delay memory and correcting the location deviation. The delay memory includes first memory having a short access delay time and second memory having a long access delay time. The servo control device includes a switching unit for assigning one of the first memory and the second memory to the learning controller, depending on a learning period according to the command pattern.

3 Claims, 3 Drawing Sheets

SERVO CONTROL SYSTEM HAVING FUNCTION OF SWITCHING LEARNING MEMORY

RELATED APPLICATIONS

The present application claims priority to Japanese Patent Application Number 2015-132050 filed Jun. 30, 2015, the disclosure of which is hereby incorporated by reference herein in its entirety.

BACKGROUND OF THE INVENTION

1. Field of the Invention

The present invention relates to a servo control system, and in particular relates to a servo control system having the function of switching memory used for learning control in accordance with a learning period.

2. Description of Related Art

Learning control is used in control of servo motors as a method for accurate motor control by converging a control deviation to zero with respect to a command that is repeated with a predetermined period in a uniform pattern, to improve processing accuracy (for example, Japanese Unexamined Patent Publication (Kokai) No. 4-323706, hereinafter called "Patent Literature 1"). The Patent Literature 1 discloses a foreknowledge repeat control method that enables a convergence of a control deviation to zero, even with respect to a command that is repeated with a predetermined period and contains a component asynchronous to the period.

The learning control includes a time synchronization scheme in which learning is performed with respect to time, and an angle synchronization scheme in which learning is performed with respect to an angle. The learning control requires the allocation of memory used therein. The use of the time synchronization scheme requires delay memory during the time from the start of processing to the end thereof, so that the longer a processing time, the larger the capacity of the delay memory required.

However, the allocation of the required delay memory in a DSP for servo control causes a cost increase with an increase in the capacity of the delay memory. Furthermore, the delay memory is of no use to a normal axis control that does not use the learning control.

SUMMARY OF THE INVENTION

The present invention aims to provide a servo control system which enables reduction in capacity of a high-speed accessible internal memory required in each DSP for use in learning control.

A servo control system according to an embodiment of the present invention includes a servo control device for driving a driven body that operates periodically using a servomotor; and a learning controller for generating correction data based on a location deviation with respect to a uniform command pattern, and storing the correction data in delay memory and correcting the location deviation. The delay memory includes a first memory having a short access delay time and a second memory having a long access delay time. The servo control device includes a switching unit for assigning one of the first memory and the second memory to the learning controller, depending on a learning period according to the command pattern.

BRIEF DESCRIPTION OF THE DRAWINGS

The objects, features, and advantages of the present invention will be more apparent from the following description of embodiments in conjunction with the attached drawings, wherein.

DETAILED DESCRIPTION OF THE INVENTION

Figure 1:
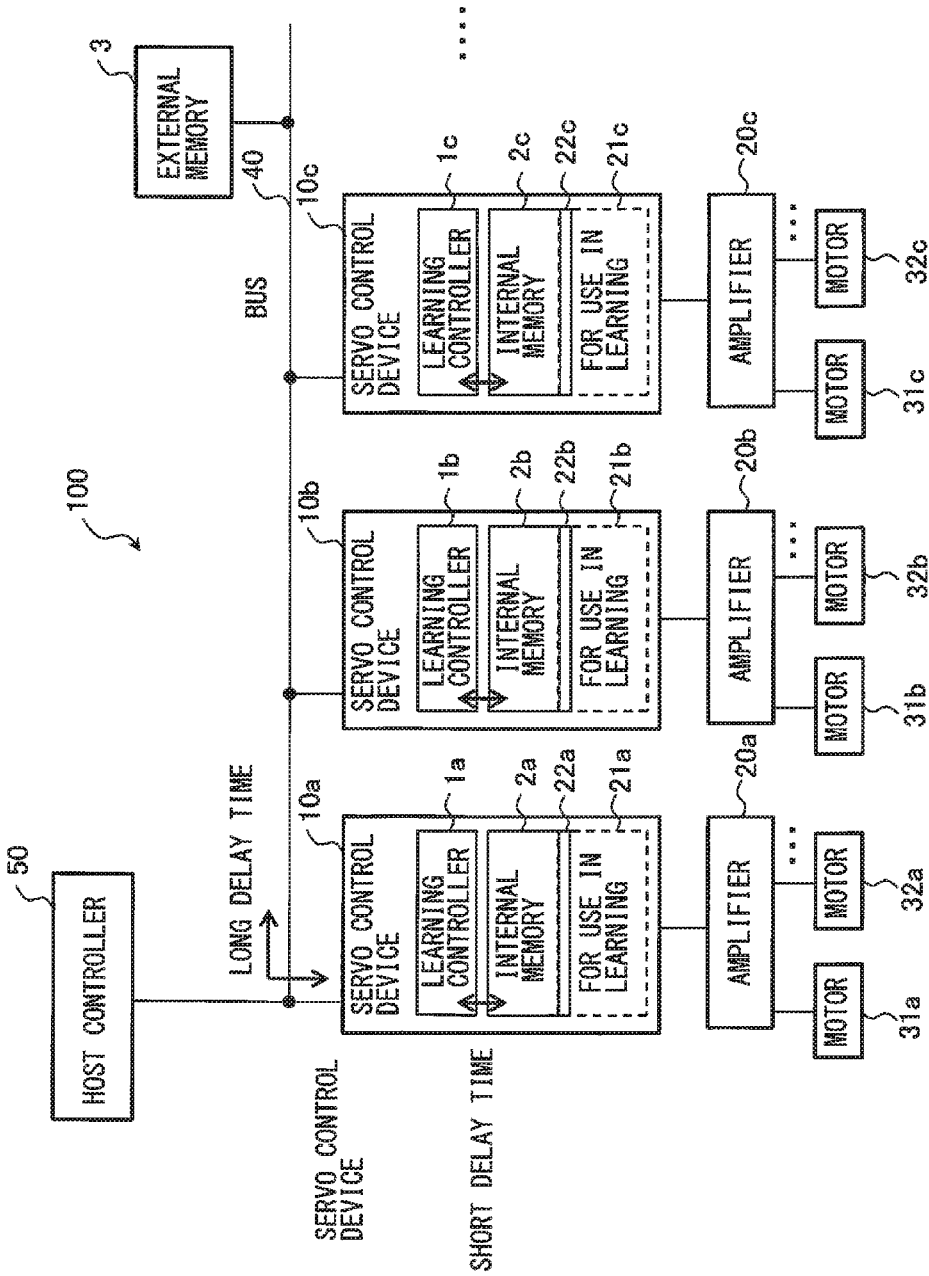
FIG. 1 is a block diagram of a servo control system according to an embodiment of the present invention.

A servo control system according to the present invention will be described below with reference to the drawings. FIG. 1 is a block diagram of a servo control system according to an embodiment of the present invention. The servo control system 100 according to the embodiment of the present invention includes servo control devices (10a, 10b, and 10c), learning controllers (1a, 1b, and 1c), internal memories (2a, 2b, and 2c), i.e., a first memory, an external memory 3, i.e., a second memory, and a switching unit (41 and 42) (see FIG. 2).

The servo control devices (10a, 10b, and 10c) drive driven bodies (not shown), which operate periodically, using servomotors (31a, 32a, 31b, 32b, 31c, and 32c). The number of the servo control devices that receive commands from a host controller 50 may be one or more. FIG. 1 shows an example of using the three servo control devices (10a, 10b, and 10c), but the number of the servo control devices is not limited thereto. The servo control devices (10a, 10b, and 10c) each receive a position command from the host controller 50, and drive the motors (31a, 32a, 31b, 32b, 31c, and 32c) using amplifiers (20a, 20b, and 20c).

Moreover, FIG. 1 shows a case where each of the servo control devices (10a, 10b, and 10c) controls the two motors, but not limited thereto, each of the servo control devices (10a, 10b, and 10c) may control only one motor or three or more motors.

The learning controllers (1a, 1b, and 1c) each generate correction data based on a location deviation with respect to a uniform command pattern, and store the correction data in delay memory and correct the location deviation.

The delay memory includes the internal memories (2a, 2b, and 2c), that is, the first memory having a short access delay time, and the external memory 3, that is, the second memory having a long access delay time. The internal memories (2a, 2b, and 2c), i.e., the first memory may be memories installed in CPUs of the servo control devices (10a, 10b, and 10c). The external memory 3, i.e., the second memory may be a memory provided outside the servo control devices (10a, 10b, and 10c). For example, the external memory 3, i.e., the second memory may be a memory connected to a bus 40 of the host controller 50.

Figure 2:
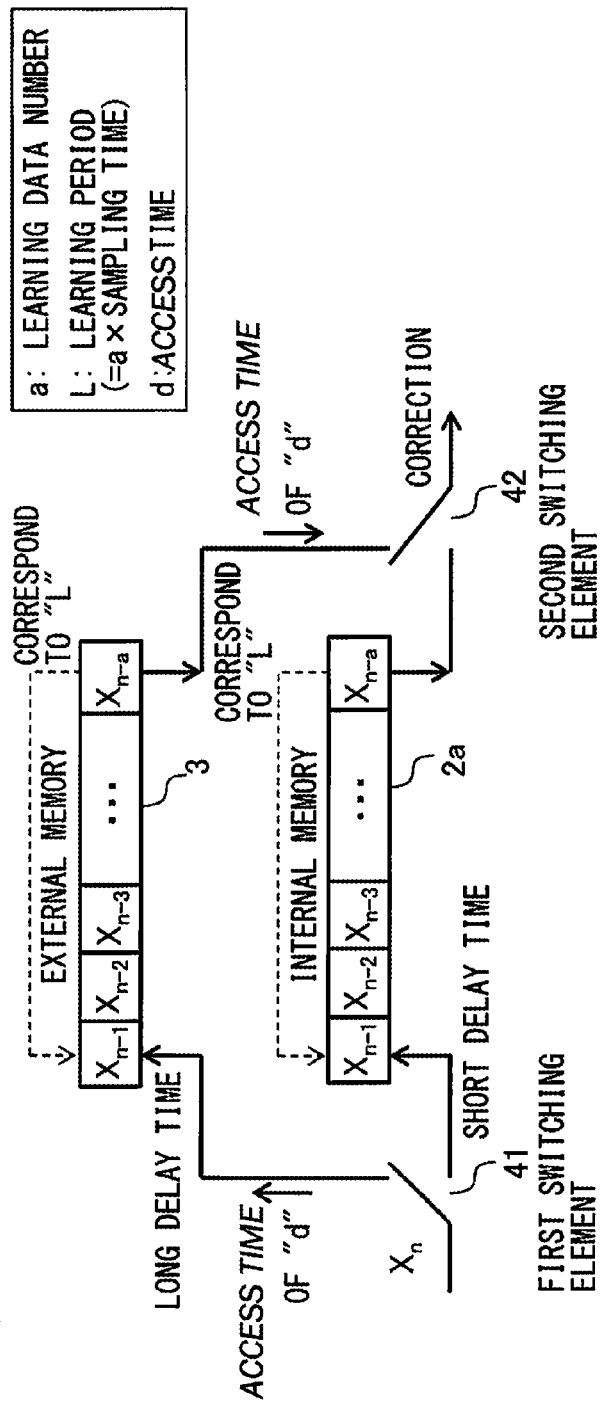
FIG. 2 is a conceptual diagram that explains the switching of delay memory by a switching unit in the servo control system according to the embodiment of the present invention.

FIG. 2 shows a conceptual diagram that explains the switching of the delay memory by a switching unit in the servo control system according to the embodiment of the present invention. The switching unit (41 and 42) assigns one of the internal memory (2a, 2b, or 2c), i.e., the first memory and the external memory 3, i.e., the second memory to the learning controller (1a, 1b, or 1c), depending on a learning period according to the command pattern.

As described above, a memory area itself for learning control is "moved" to a location other than a DSP for servo control and "shared", and thereby the learning memory area for each axis can be reduced. However, since it takes time (a communication delay) to access the moved memory area, the moved memory area cannot be used for learning control with a shorter period than the delay time. Thus, in the servo control system according to the embodiment of the present invention, learning memory in the DSP for the servo control is not totally removed but remains by an amount corresponding to the communication delay, and switched automatically.

To be more specific, in the servo control devices (10a, 10b, and 10c) shown in FIG. 1, the absence of the external memory 3 requires large capacity memories (21a, 21b, and 21c) as the learning memory. In the present invention, only memories (22a, 22b, and 22c) having a capacity corresponding to the communication delay remain. As a result, it is possible to reduce the capacity of the learning memory required in the servo control devices (10a, 10b, and 10c) to a minimum amount.

Next, the operation of the switching unit will be described. As shown in FIG. 2, the internal memory 2a and the external memory 3 each have memory spaces ($X_{n-1}$, $X_{n-2}$, $X_{n-3}$, ..., $X_{n-a}$) for storing the correction data for one pattern period of an operation, such as a machining shape upon repetitions of a command, divided by a learning data number "a". A learning period L is the product of a sampling time and "a" (L=a×sampling time).

At this time, an access time from the learning controller 1a to the internal memory 2a is short, while an access time from the learning controller 1a to the external memory 3 is necessarily long. The access time from the learning controller 1a to the external memory 3 is represented by "d". When performing a learning control using the external memory 3, a signal has a round-trip delay of "2d". This time "2d" is defined as "delay time".

When the learning period L is longer than the delay time "2d" of the external memory 3, i.e., the second memory (L>2×d), in other words, a time required to generate the correction data is longer than the total delay time between the learning controller 1a and the external memory 3, the switching unit (41 and 42) selects the external memory 3, i.e., the second memory. On the other hand, when the learning period L is equal to or shorter than the delay time "2d" of the external memory 3, i.e., the second memory (L≤2×d), in other words, the time required to generate the correction data is equal to or shorter than the total delay time between the learning controller 1a and the external memory 3, the switching unit (41 and 42) selects the internal memory 2a, i.e., the first memory.

The switching unit includes a first switching element 41 and a second switching element 42. The first and second switching elements 41 and 42 switch whether to output data $X_n$ to the internal memory 2a or the external memory 3 in synchronization with each other by a command from the learning controller 1a.

A capacity for learning data corresponding to the total delay time 2d of the external memory 3 is adequate to the internal memory 2a. The switching between the external memory 3 and the internal memory 2a is preferably performed automatically based on the learning period.

It is noted that FIG. 2 explains the switching between the internal memory 2a provided in the servo control device 10a and the external memory 3. The switching between the internal memory 2b provided in the servo control device 10b and the external memory 3, and between the internal memory 2c provided in the servo control device 10c and the external memory 3 can be performed in a like manner.

Figure 3:
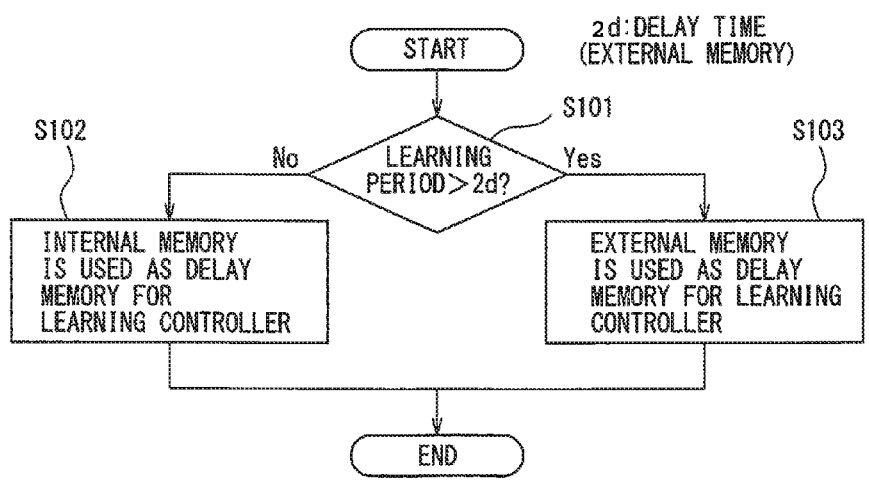
FIG. 3 is a flowchart that explains the operation process of the servo control system according to the embodiment of the present invention.

Next, the operation process of the servo control system according to the embodiment of the present invention will be described with reference to a flowchart shown in FIG. 3. First, in step S101, the learning controller 1a determines whether or not a learning period L is longer than a delay time 2d. When the learning period L is equal to or shorter than the delay time 2d, in step S102, the internal memory 2a is used as the delay memory for the learning controller 1a. On the other hand, when the learning period L is longer than the delay time 2d, in step S103, the external memory 3 is used as the delay memory for the learning controller 1a.

The switching unit (41 and 42) can be switched at any time except during learning. Particularly, the switching unit (41 and 42) is preferably switched just before starting the next learning control.

According to the servo control system of the embodiment of the present invention, as described above, the large capacity external memory is provided, and whether to use the internal memory or the external memory is switched in accordance with a learning period. As a result, the switching is performed such that when the learning period is short, the internal memory having a short delay time is used as the delay memory for use in learning control, while when the learning period is long, the large capacity external memory provided outside having a long delay time is used.

The servo control system according to the embodiment of the present invention serves to reduce the capacity of the high-speed accessible internal memory, which is required in each DSP for use in learning control.

What is claimed is:

1. A servo control system comprising:
a servo control device for driving a driven body that operates periodically using a servomotor; and
a learning controller for generating correction data based on a location deviation with respect to a uniform command pattern, and storing the correction data in delay memory and correcting the location deviation,
wherein the delay memory includes a first memory having a short access delay time and a second memory having a long access delay time,
wherein the servo control device includes a switching unit for assigning one of the first memory and the second memory to the learning controller, depending on a learning period according to the command pattern, and
wherein the switching unit is switched such that
when the learning period is longer than the delay time of the second memory, the second memory is selected, and
when the learning period is equal to or shorter than the delay time of the second memory, the first memory is selected.

2. The servo control system according to claim 1, wherein the first memory is a memory installed in a CPU of the servo control device.

3. The servo control system according to claim 1, wherein the second memory is a memory provided outside the servo control device.

* * * * *